United States Patent [19]
Shields

[11] 3,734,152
[45] May 22, 1973

[54] METHOD AND APPARATUS FOR HARVESTING TREES

[75] Inventor: Dean W. Shields, Toledo, Ohio

[73] Assignee: Owens-Illinois, Inc., Toledo, Ohio

[22] Filed: Dec. 24, 1969

[21] Appl. No.: 887,903

[52] U.S. Cl. .................................. 144/3 D, 144/2 Z
[51] Int. Cl. .............................................. A01g 23/08
[58] Field of Search ..................... 144/2 Z, 3 D, 34 R, 144/34 E, 309 AC

[56] References Cited

UNITED STATES PATENTS

| | | | |
|---|---|---|---|
| 3,183,951 | 5/1965 | Larson | 144/3 D |
| 3,238,981 | 3/1966 | Larson et al. | 144/2 Z |
| 3,461,926 | 8/1969 | Larson | 144/3 D |

*Primary Examiner*—Gerald A. Dost
*Attorney*—E. J. Holler and Alan J. Steger

[57] ABSTRACT

A novel combination delimber and top shear utilized as an integral part of tree harvester. The tree harvester incorporating the delimber and top shear unit of this invention includes a horizontally oriented mast which is mounted on a mobile vehicle. A butt shear and felling grapple are pivotally mounted at one end of the mast and are adapted to grasp and sever a standing tree and pivot it to a substantially horizontal position overlying the mast where it is grasped and securely held by a transfer grapple. The novel combination delimber and top shear unit, which includes a pair of delimber arms and a pair of top shear blades, is mounted for longitudinal movement on the top of the mast and is adapted to be driven along the tree to strip all limbs from the tree and also to remove the top portion of the tree at either a predetermined length or diameter. After the tree has been delimbed and topped, it is dropped by the transfer grapple into collection arms positioned at intervals along the mast and adapted to hold a large number of delimbed and topped trees to be transported by the tree harvester to a collection point where the trees are deposited in a stack.

20 Claims, 13 Drawing Figures

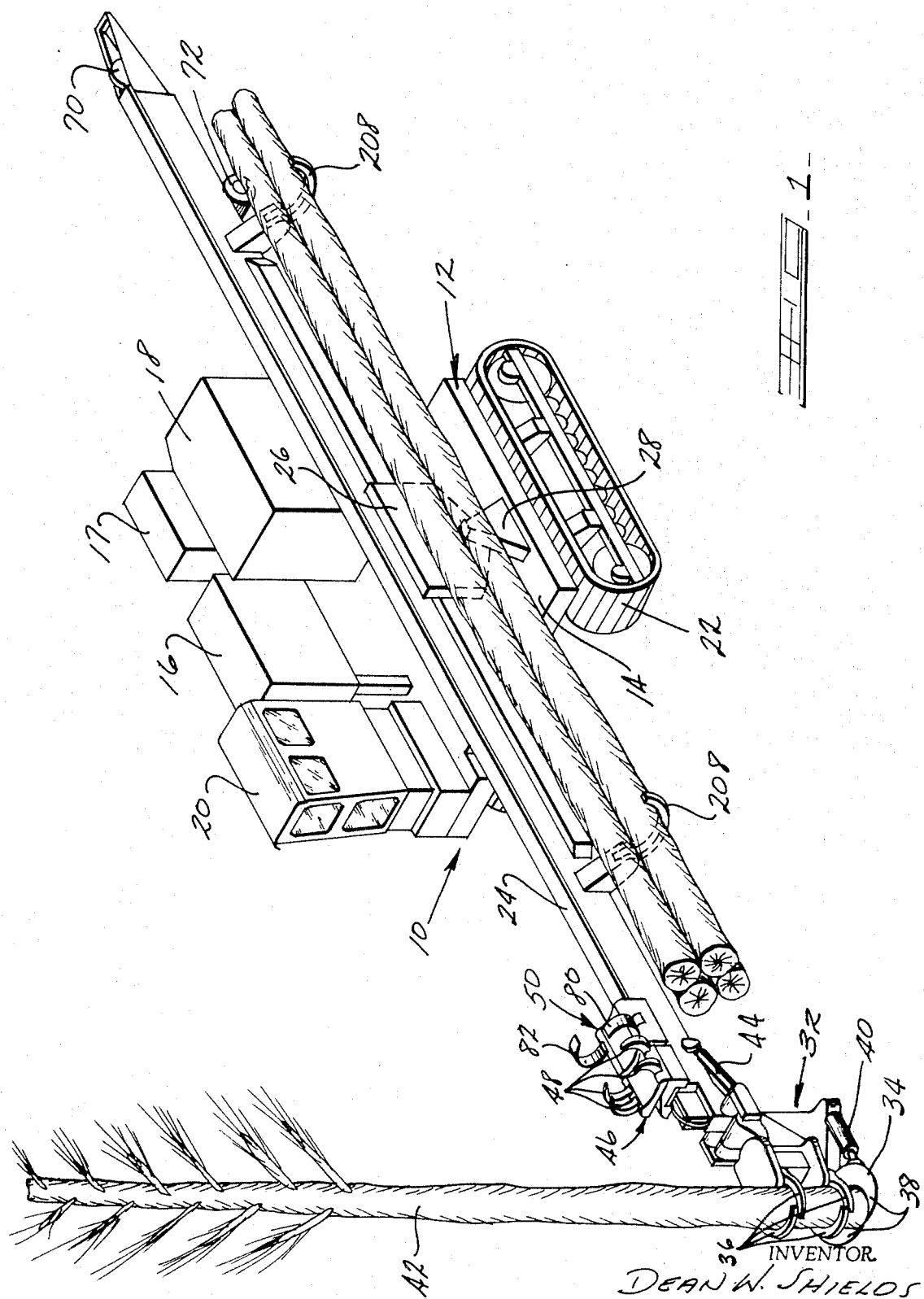

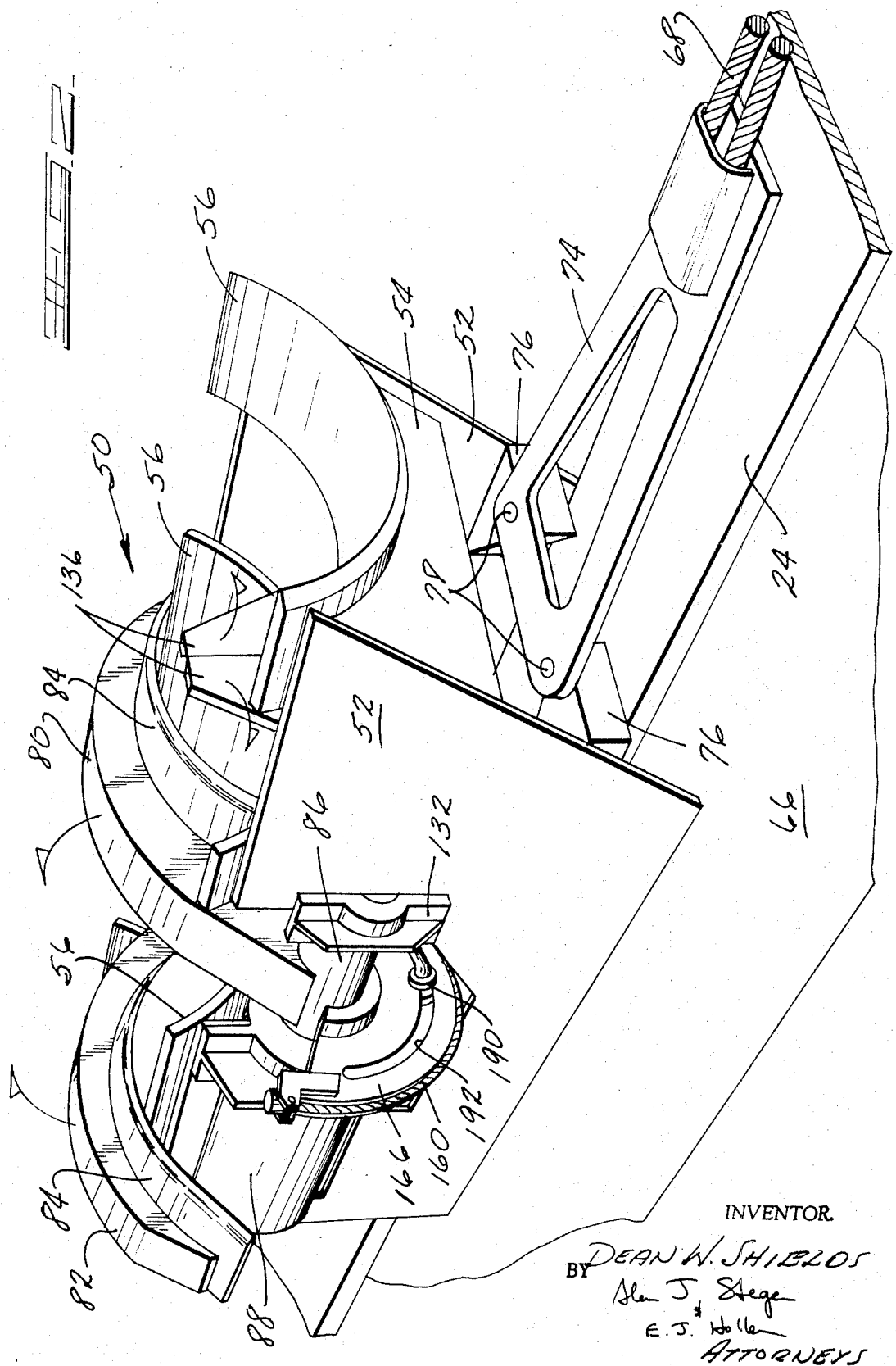

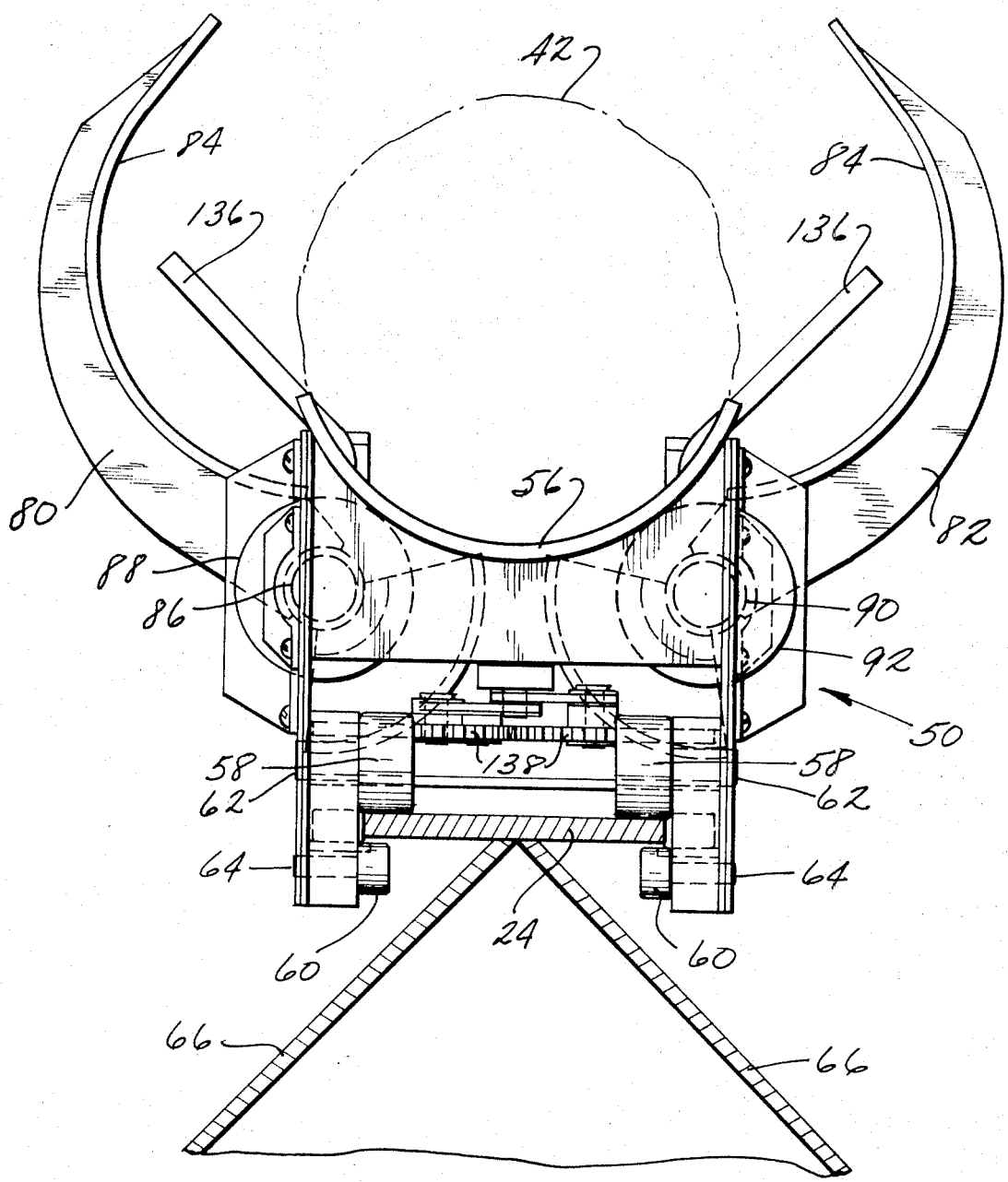

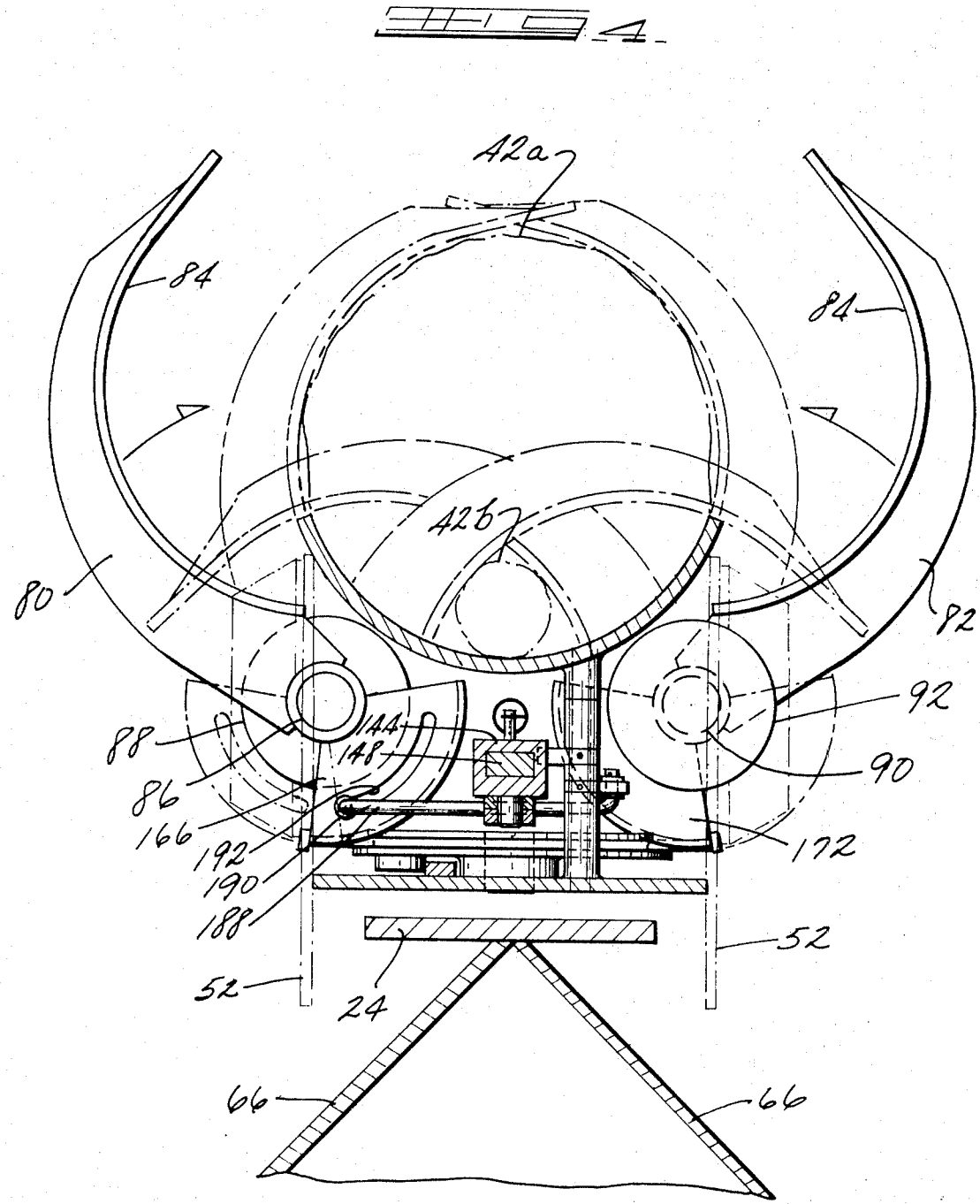

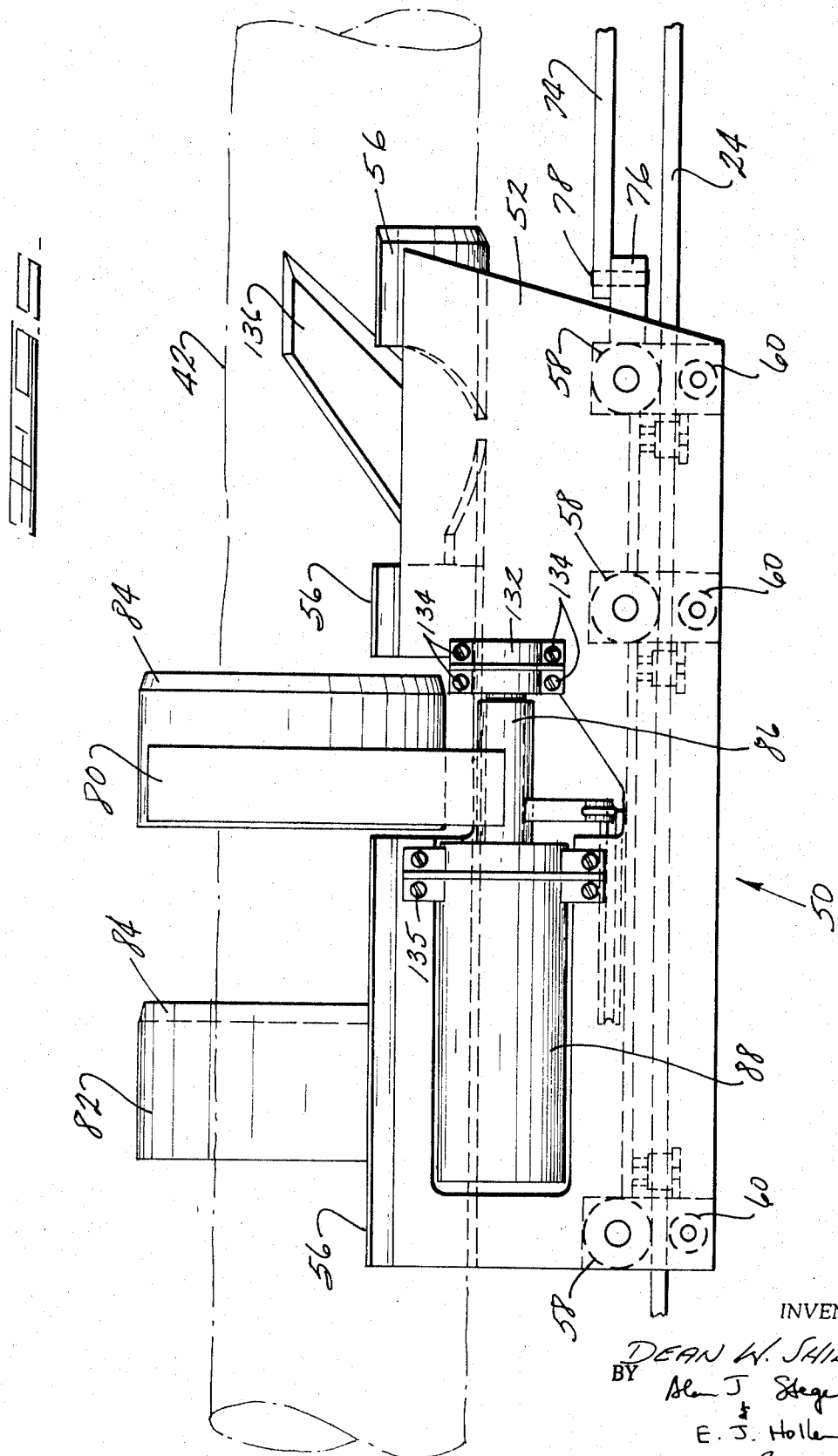

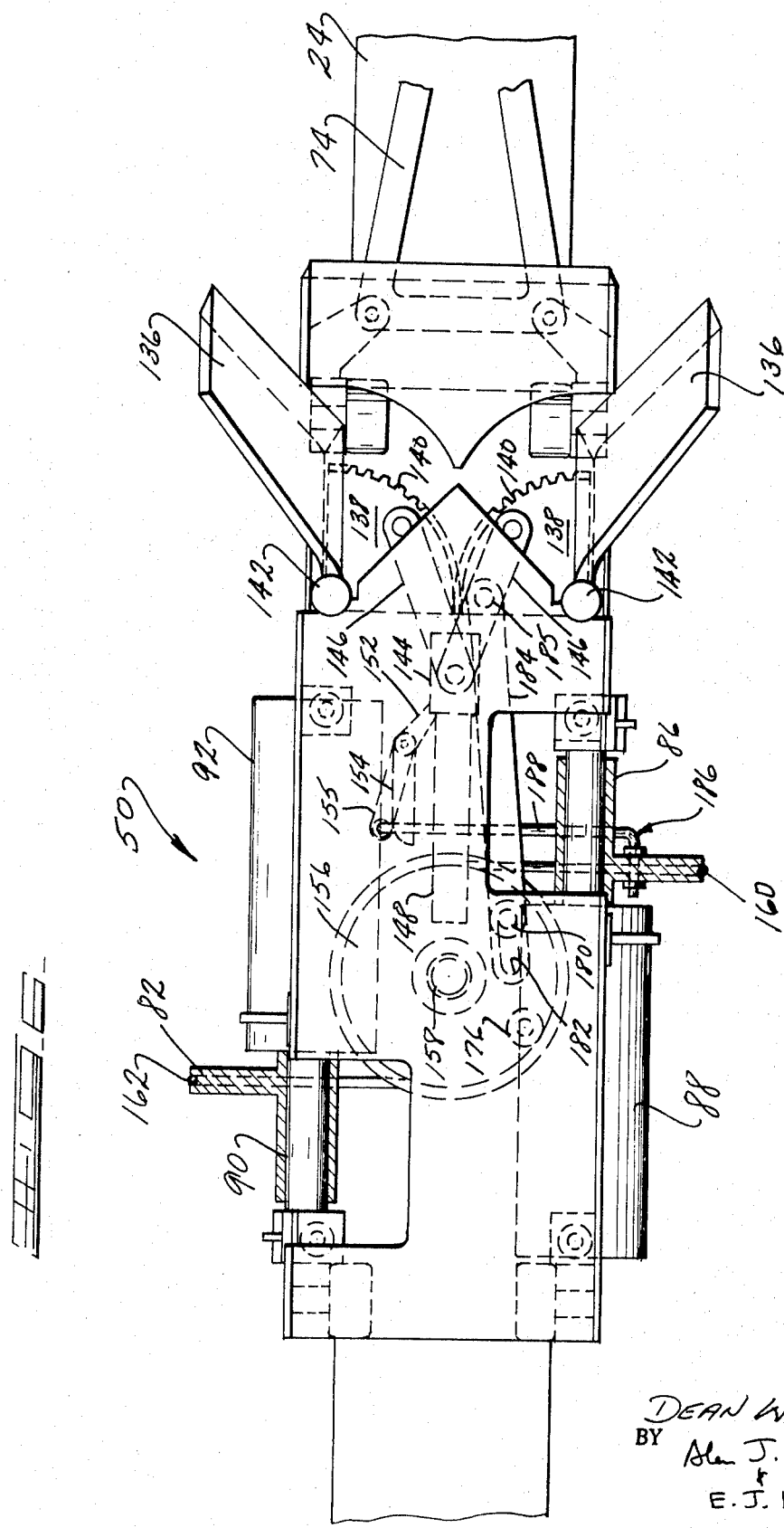

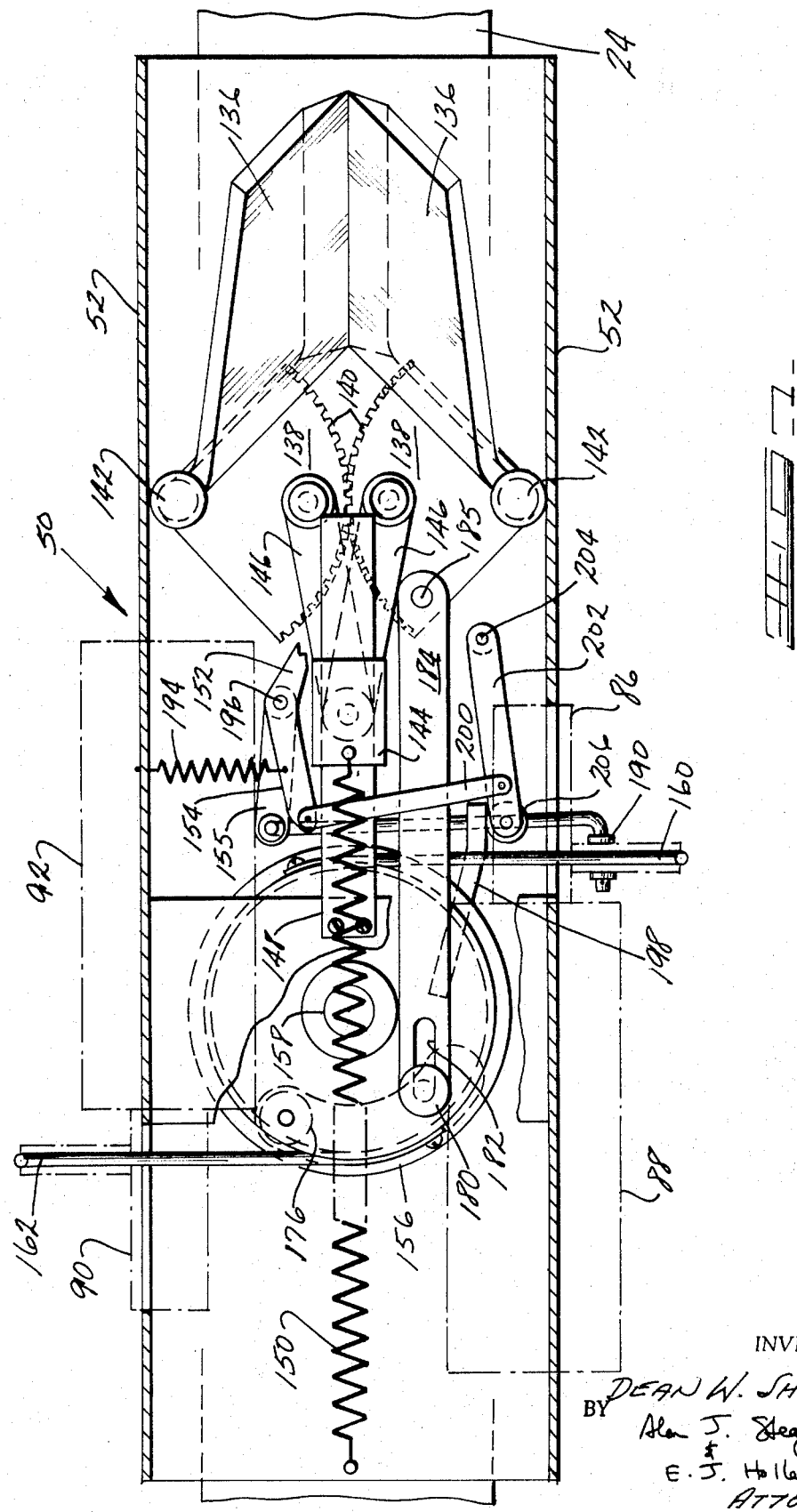

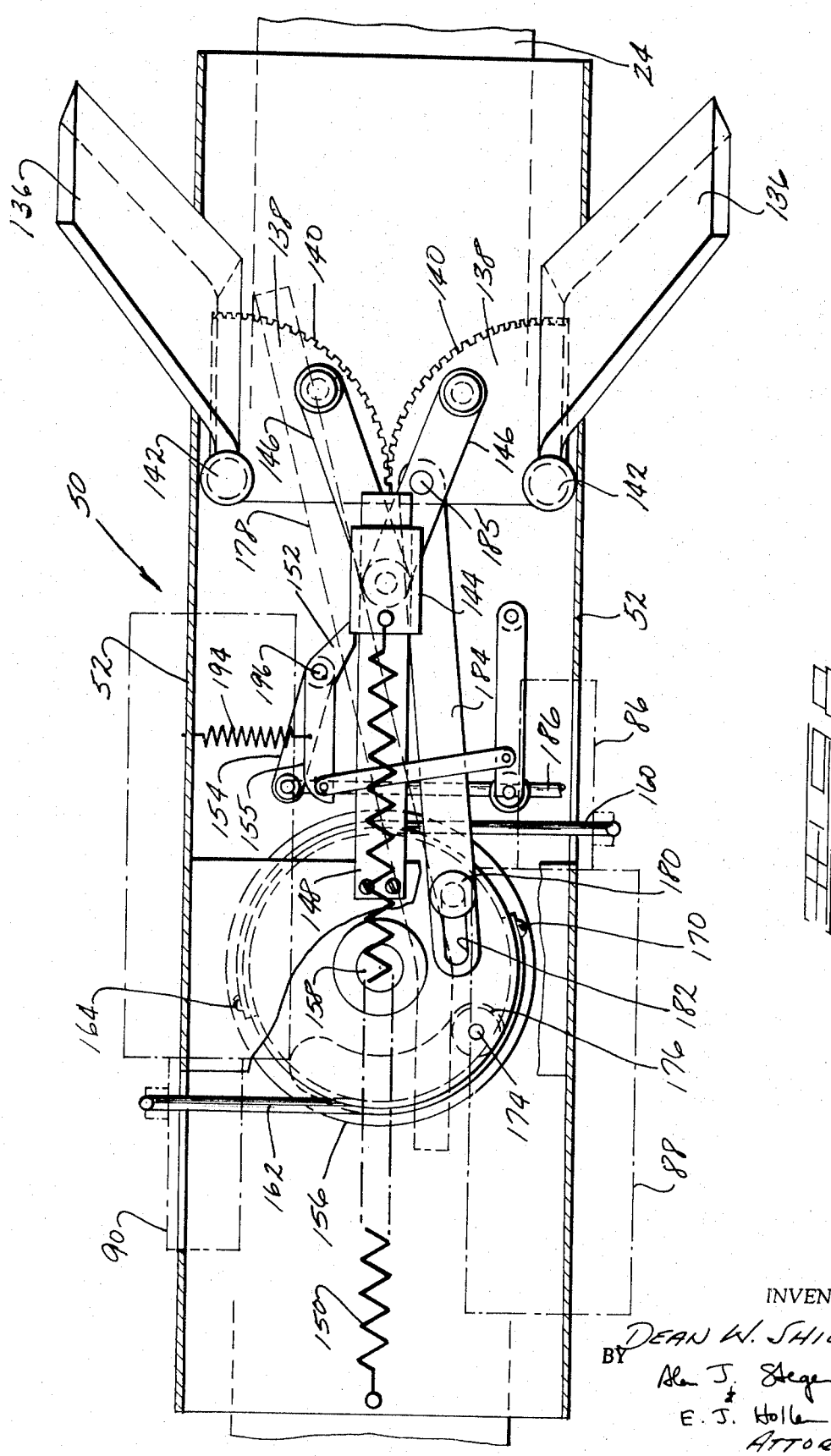

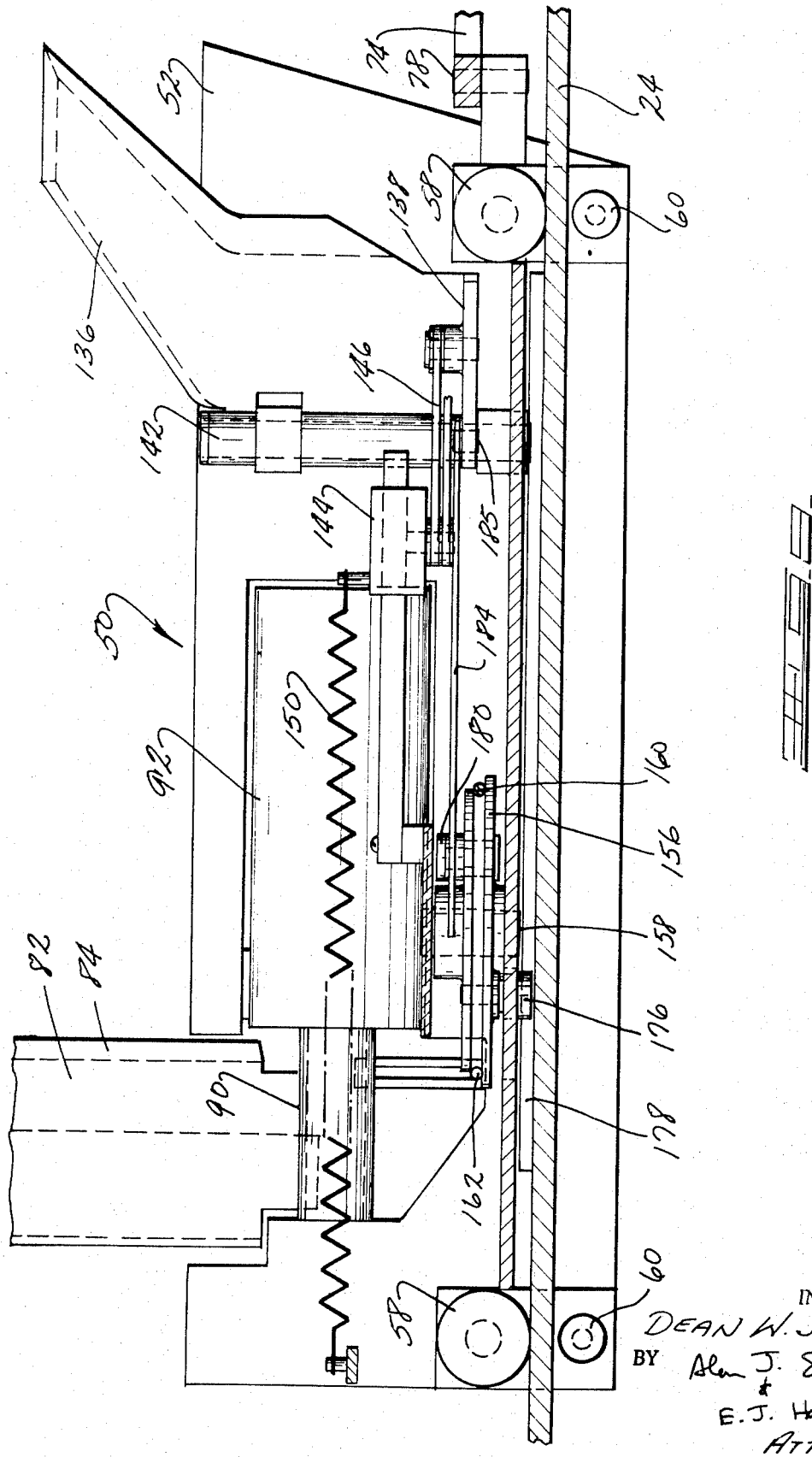

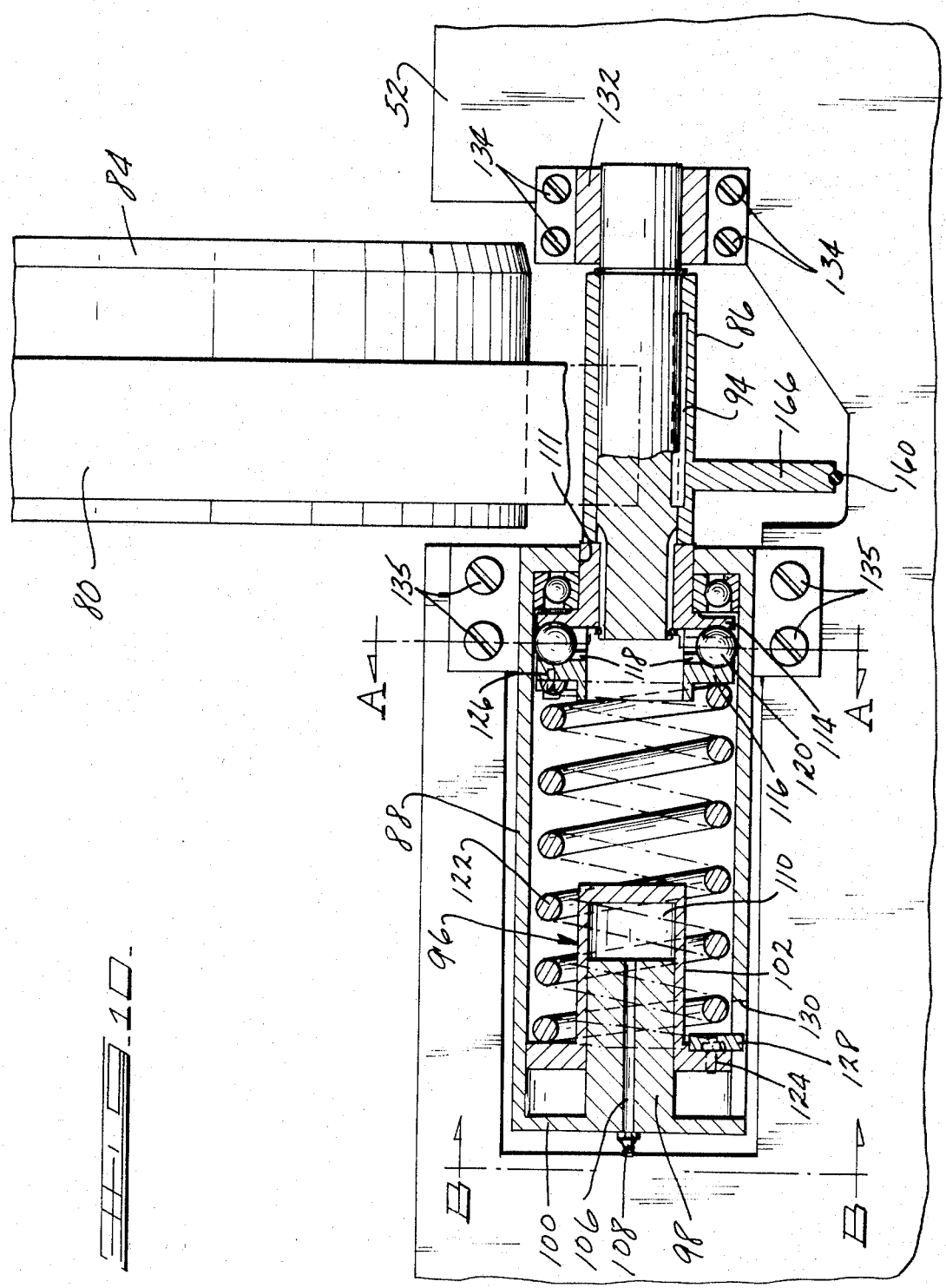

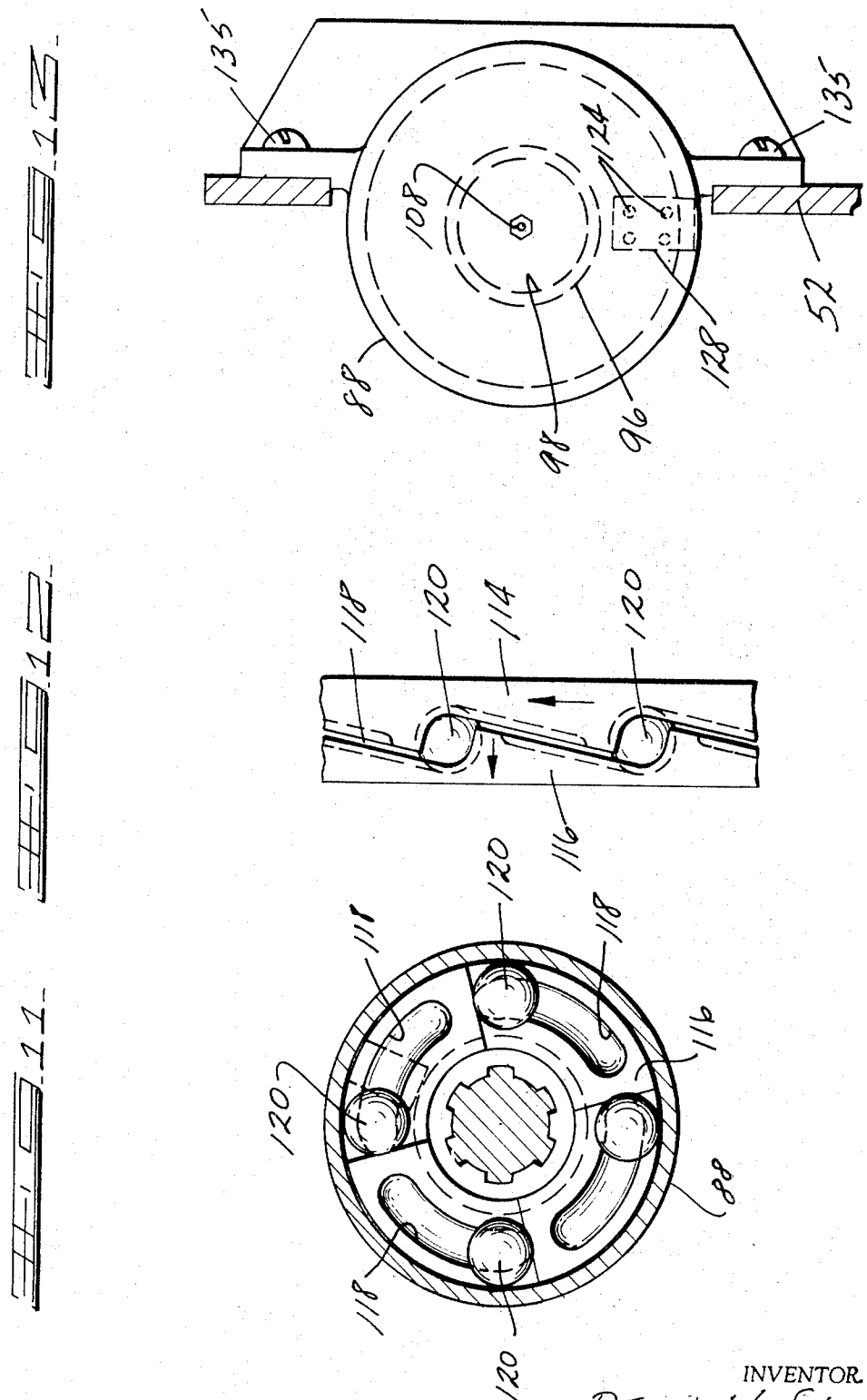

METHOD AND APPARATUS FOR HARVESTING TREES

BACKGROUND OF THE INVENTION

This invention relates to a novel method and apparatus for harvesting and processing trees.

More specifically, this invention relates to a novel combination delimber and top shear which is adapted to be driven along a tree to strip all limbs from the tree and also to remove the top portion of the tree at either a predetermined length or diameter. This combination delimber and top shear is well suited to be utilized as an integral part of a tree harvesting apparatus such as that disclosed in copending U.S. Ser. No. 887,937 filed Nov. 19, 1969 and now U.S. Pat. No. 3,618,647 and assigned to the same assignee as the subject invention.

Historically, trees have been harvested by methods requiring various sequences of operations and the use of a number of different tools, tractors, horses, saws, skidders, trucks, cranes and the like. More specifically, trees have been felled by using hand saws manually, manipulated power saws, axes, wedges and guide ropes. These procedures obviously require a considerable amount of manual labor. In order to reduce the amount and cost of the manual labor various machines have been proposed heretofore for felling trees, but such machines have not been found to be sufficiently practical for harvesting trees from a forest.

It is, therefore, an object of this invention to provide a tree harvesting machine incorporating a unique combination delimber and top shear mechanism which completely processes a tree and overcomes the disadvantages associated with previously known tree harvesting machinery.

SUMMARY OF THE INVENTION

This invention provides a novel combination delimber and top shear utilized as an integral part of a tree harvesting machine which will cut, delimb, top, transport and deposit a plurality of trees in a stack at a desired collection point.

In general, the tree harvesting machine of this invention includes a substantially-horizontally extending mast which is mounted on a mobile vehicle. A butt shear and felling grapple are pivotally mounted at one end of the mast and are adapted to grasp and sever a standing tree and pivot it to a substantially horizontal position overlying the mast. A transfer grapple is mounted on the mast at the same end as the butt shear and felling grapple and is adapted to receive and securely hold the tree after it has been laid down by the felling grapple. The novel combination delimber and top shear of this invention is mounted for longitudinal movement on the top of the horizontal mast and is adapted to be driven along the tree to strip all limbs from the tree and to remove the top portion of the tree at either a predetermined length or predetermined diameter. A plurality of tree collection arms are attached to one side of the horizontal mast and are adapted to receive a large number of delimbed and topped trees to be transported by the tree harvester to a collection point where the trees can be dropped in a bundle.

Other objects, features and advantages of this invention will become obvious upon reference to the following detailed description of the invention and the drawings illustrating the preferred embodiment thereof.

IN THE DRAWINGS

FIG. 1 is a perspective view of the tree harvester of this invention holding several processed trees to be transported with the harvester and grasping a new standing tree to be processed.

FIG. 2 is a perspective view of the novel combination delimber and top shear unit utilized in the tree harvester of this invention.

FIG. 3 is an end view with parts broken away in section of the combination delimber and top shear unit of FIG. 2 showing the unit in the open or tree receiving position.

FIG. 4 is an end view with parts broken away in section of the combination delimber and top shear unit of FIG. 3 showing the progressive radial movement of the delimber arms (from solid lines to dash-dot-dot lines to dash-dot lines) as the unit moves along a tree from the base or large diameter end of the tree toward the top or small diameter end of the tree.

FIG. 5 is a side elevational view of the combination delimber and top shear unit of FIG. 2 showing the delimber closed around the tree and the top shear blade open.

FIG. 6 is a top view with parts broken away in section of the combination delimber and top shear unit of FIG. 5 showing the opening and closing apparatus for the delimber arms and top shear blades.

FIG. 7 is an enlarged sectional view of the combination delimber and top shear unit of FIG. 6 showing the opening and closing apparatus after it has been actuated to close the top shears.

FIG. 8 is an enlarged sectional view of the combination delimber and top shear unit of FIG. 7 showing the opening and closing apparatus after it has been actuated to open the delimber arms and the top shear blades.

FIG. 9 is a side elevational view of combination delimber and top shear unit of FIG. 8.

FIG. 10 is a sectional view of an actuating cylinder and mounting shaft utilized in connection with each delimber arm as shown in FIG. 5.

FIG. 11 is a cross-sectional view of the actuating cylinder taken in the direction of lines A—A in FIG. 10.

FIG. 12 is a developed length view of a portion of FIG. 11.

FIG. 13 is an end view of the actuating cylinder taken in the direction of lines B—B in FIG. 10.

DETAILED DESCRIPTION OF THE INVENTION

A tree harvester of which the novel combination delimber and top shear of this invention is an integral part is shown in FIG. 1 and is indicated generally by the numeral 10. A mobile vehicle supporting and powering the tree harvesting apparatus of this invention is indicated generally by the numeral 12 and may comprise any mobile vehicle such as a crawler tractor having a swingable base platform 14, power plant units 16, 17 and 18, operator cab 20, and endless treads 22. The mobile vehicle 12 may be of any suitable type which is adapted to support the tree harvester apparatus and convey it into a forest type area. In addition, the power plant units 16, 17 and 18 may be of any standard type suitable to propel the vehicle 12 and to provide power for operating the various tree harvesting apparatus which is hereinafter described.

The main structural component of the tree harvesting apparatus is a mast 24 which is telescopingly mounted in a generally horizontal position within a mast collar 26. The mast collar 26 is pivotally mounted above and supported on the base platform 14 by means of a mounting flange 28. A hydraulic actuating mechanism (not shown) is mounted between the base platform 14 and the mast collar 26 to control the vertical position of the mast 24. The mast 24 is adapted for linear movement relative to the mast collar 26 and driven by means not shown. Thus, it should be understood that the position of the mast 24 may be controlled both to move the mast into and away from the mobile power unit 12 and also to change the angle of the mast 24 with respect to the horizon.

Pivotally mounted at one end of the mast 24 is a felling grapple unit 32 which includes a butt shear mechanism 34 and four grasping arms 36. The butt shear 34 includes a pair of shearing blades 38, each of which are actuated for movement relative to the felling grapple unit 32 by means of a hydraulic cylinder 40 (only one is visible in FIG. 1). The blades 38 are adapted to completely sever the trunk of a tree when actuated by the cylinders 40. The four grasping arms 36 securely hold and position the trunk of a tree while the cutting blades 38 of the butt shear 34 sever the tree at a location close to ground level. The felling grapple unit 32 is actuatable to pivot 90° relative to the mast 24 by means of a hydraulic cylinder 44. Thus, once the butt shear 34 has severed a tree (such as the large standing tree 42 in FIG. 1) the cylinder 44 is actuated to pivot the felling grapple unit 32 and the tree 42 to a horizontal position parallel to the mast 24.

Fixed to the top of the mast 24 at the same end as the felling grapple unit 32 is a transfer grapple unit 46. The transfer grapple unit 46 includes four grasping arms 48 which are very similar to the grasping arms 36 on the felling grapple unit 32. It is the function of the grasping arms 48 on the transfer grapple 46 to securely hold and position the tree in an overlying position with respect to the mast 24 while the delimbing and topping functions are performed by the novel apparatus of this invention to be described hereinafter. When the tree 42 has been pivoted by means of the felling grapple unit 32 to a position overlying the mast 24, the grasping arms 48 of the transfer grapple 46 are closed to grasp and securely hold the tree 42. At this time, the arms 36 may be opened and the felling grapple unit 32 pivoted downwardly 90° to its original position in preparation for grasping and severing another tree.

The main feature of this invention, a combination delimber and top shear unit (hereinafter referred to as "the unit"), is indicated generally by the numeral 50. The unit 50 includes both delimbing and topping apparatus and is mounted on and adapted for longitudinal movement along the mast 24. The main frame of the unit 50 comprises a pair of side members 52 which are connected by lateral support members 54. The lateral support members 54 terminate at their upper extremities in semicircular tree receiving and supporting cradles 56. The unit 50 is adapted for longitudinal movement on the upper surface of the mast frame 24 by means of rollers 58 and 60. The rollers 58 and 60 are mounted for rotation on shafts 62 and 64, respectively, which are supported within side members 52. As can best be seen in FIG. 3, the larger rollers 58 are positioned to roll along the top surface of the mast frame 24 and the smaller rollers 60 are positioned to act as stabilizers on the lower surface of the mast frame 24. The mast frame 24 is strengthened by being integral with a V-shaped support channel 66.

The unit 50 is moved along the mast frame 24 by means of a cable 68 which is pulled around pulleys 70 on the mast 24 by means of a cable drive device 72. The cable 68 is securely attached to a cable hitch 74 which in turn is secured to the side members 52 of the unit 50 by means of retainer blocks 76 and bolts 78.

The novel delimber and top shear unit 50 of this invention includes a pair of curved delimber arms 80 and 82, each of which has a cutting blade 84 on its interior arcuate edge. The delimber arms 80 and 82 are each mounted for rotational movement on a shaft and are normally spring biased into the closed position around the circumference of a tree as shown by the dash-dot lines in FIG. 3. Delimber arm 80 is mounted on shaft 86 which is biased by a spring contained within a cylinder 88. Similarly, delimber arm 82 is mounted on a shaft 90 which is biased by a spring housed within a cylinder 92. The respective shafts and actuating cylinders for the delimber arms 80 and 82 are identical so that the following description of the shaft 86 and cylinder 88, as appears in FIGS. 10 through 13, is also applicable to shaft 90 and cylinder 92.

In FIG. 10, it can be seen that the delimber arm 80 is keyed to shaft 86 by means of a key 94. A piston 96 fits the walls of cylinder 88 and is mounted over a rod 98 which is rigidly fastened to an end portion 100 of the cylinder 88. The piston 96 includes a hollow cylindrical portion 102 which fits snugly over the rod 98 and is closed at one end 104. The rod 98 includes an axial opening 106 along its entire length which may be closed by means of a plug 108. Thus, as the piston 96 is moved to the right, away from the fixed rod 98, a chamber 110 is formed within the hollow cylinder portion 102 of the piston 96 between the rod 98 and the end 104 of the piston 96. This chamber 110 is adapted to receive fluid through the opening 106 in the rod 98. As a fluid (such as grease, for example) is injected into the chamber 110 the piston 96 is forced to move away from the rod 98.

The shaft 86 enters the cylinder 88 through opening 111 and is held therein by a thrust bearing 112 which bears against a clutch plate 114 on the interior end of shaft 86. A second clutch plate 116 is mounted adjacent to the first clutch plate 114 within cylinder 88. As can best be seen in FIGS. 11 and 12, the matching clutch plates 114 and 116 each have a plurality of mating grooves 118 which coact to form an annular inclined plane therebetween. A plurality of spherical balls 120 are positioned between the plates 114 and 116 within the grooves 118. A large coil spring 122 is mounted within the cylinder 88 and fastened at its opposite ends to the piston 96 at 124 and to the clutch plate 116 at 126. The spring 122 is prevented from rotating by means of a latch bar 128 which is fixed to the spring 122 and the piston 96 and restricted within a keyway 130 in the cylinder 88.

Thus, it should be understood that as grease is introduced into the chamber 110, the piston 96 is forced to travel in a direction to the right in FIG. 10, thereby compressing the spring 122 against the clutch plate 116. The force of spring 122 on clutch plate 116 causes the balls 120 in the inclined annular plane formed by grooves 118 to impart a rotation to the clutch plate 114 and shaft to thereby bias the delimber arm 80 into engagement with a tree to be delimbed. In order to move the delimber arm 80 outwardly (to the open position), clutch plate 114 rotates against the balls 120 which must push the clutch plate 116 in the axial direction against the force of spring 122. Thus, delimber arm 80 is normally spring biased inwardly and can be moved to the open position only by overcoming the biasing force of spring 122. The amount of force applied by the spring 122 may be controlled by adjusting the position of piston 96 through the amount of grease introduced into the chamber 110. It should be noted further that the shaft 86 is positioned at its other end within a bearing 132 which is attached to the side member 52 by means of bolts 134. It should be understood that the mounting and biasing apparatus for delimber arm 82 is identical to that described in connection with delimber arm 80. Also, cylinder 88 is attached to side member 52 by means of bolts 135.

Another integral part of the unit 50 is a top shear mechanism which comprises a pair of knife edge blades 136 which are actuatable to shear through a tree trunk at either a predetermined length of the tree of at a predetermined diameter to thereby remove the top portion of the tree. The top shear blades 136 are mounted on a pair of timing gears 138 which have meshing teeth 140. Both the top shear blades 136 and the timing gears 138 are mounted for rotation on a pair of pivot posts 142. The timing gears 138 are each connected to a floating block 144 by means of a pair of connecting arms 146 as can be seen in FIGS. 7 and 8. The floating block 144 is mounted for rectilinear movement on a rectangular beam 148 and is biased towards the delimber arms (tending to close the top shear blades 136) by means of a tension spring 150. The top cutting blades 136 are held in the open position (as shown in FIGS. 8 and 9) by means of a latch 152 which is pivotally attached to a pair of trigger arms 154 and 155. The latch 152 abuts a corner of the floating block 144 to fix the position of the connecting arms 146 and maintain the top cutting blades 146 in the open position.

The operation of the delimbing arms and top shear can best be understood by concentrating on the apparatus shown in FIGS. 6 through 9. In FIG. 8, it can be seen that an actuating plate 156 is provided to rotate about a pivot 158. The actuating plate 156 is circular and has attached thereto and wrapped around a portion of its circumference a pair of delimber arm cables 160 and 162. The delimber arm cable 160 is attached to the circumference of the actuating plate 156 at one end by means of bolt 164. The cable 160 is connected at its other end to a counter-balance plate 166 which is connected to the delimber arm 80 and pivots with the delimber arm 80 about shaft 86. Similarly, the delimber arm cable 162 is attached to the actuating plate 156 at one end by means of bolt 170. Likewise, cable 162 is attached at its opposite end to a counter-balance plate 172 which is connected to the delimber arm 82 and rotates about the shaft 90. Attached to the actuating plate 156 by means of a pin 174 is a cam follower 176. The cam follower 176 is adapted to engage and follow a cam 178 which is positioned on the mast 24 at a location near the front end of the tree harvester (adjacent the transfer grapple 46). A pin 180 is attached at one end to the actuating plate 156 and at its other end resides within a lost motion slot 182 near one end of top shear opening bar 184. The top shear opening bar 184 is attached at its other end by means of pin 185 to one of the timing gears 138.

To understand the initial operation of the unit 50 reference should be had to FIG. 8. In FIG. 8, the unit 50 is positioned adjacent to the transfer grapple 46 and the delimber arms 80 and 82 and the top shear blades 136 are in the open position and adapted to receive a tree. After the unit 50 has received a felled tree and moves away from the transfer grapple 46 (to the right in FIG. 8), the cam follower 176 follows the incline of cam 178 thereby rotating the actuating plate 156 in the clockwise direction. This clockwise rotation of the actuating plate 156 then forces the delimber arm cables 160 and 162 to be peeled off or payed out from the actuating plate 156 thereby allowing the actuating springs 122 to spring bias the delimber arms into contact with the tree trunk 42a (in FIG. 4). Simultaneously, pin 180 moves within the lost motion 182 and does not move the top shear opening bar 184. In the meantime, the latch 152 remains in contact with the floating block 144 to maintain the top shear blades 136 in the open position. As shown in FIG. 4, while the unit 50 proceeds along the trunk of the tree from the thick portion designated 42a to the narrow portion designated 42b, the delimber arms 80 and 82 are spring biased radially inward to remain in contact with the tree. This is illustrated in FIG. 4 by the transition from the position shown in full lines to that shown in dash-dot-dot lines and to that shown in dash-dot lines.

The apparatus will maintain the position shown in FIG. 6 until either a predetermined diameter of the tree or a predetermined length is reached. If it is desired to actuate the top shears 136 to top the tree at a given diameter, a diameter sensing means 186 is provided. This diameter sensing means includes a connecting rod 188 which is fastened at one end to the trigger 155 and to a pin 190 at its other end. The pin 190 resides in a lost motion slot 192 in the counter-balance plate 166 which rotates with the delimber arm 80. Thus, as the delimber arms move radially inward, the pin 190 moves along the slot 192 until it abuts the end thereof at which point it moves with the counter-balance plate 166 to pivot the trigger 154 and about its pivot point 196 to release the latch 152 from the floating block 144. Once the latch 152 is released, the floating block 144 is allowed to move along slot 148 under the action of spring 150 to thereby close the top shears 136 and top the tree. It should be noted that timing gears 138 with meshing teeth 140 are utilized so that the movement and force of the two cutting blades 136 are equal. Therefore, it can be seen that once the delimber arms 80 and 82 have pivoted radially inward as they follow the tree trunk to a point where a given minimum diameter is reached, the connecting rod 188 is actuated to release latch 152 and allow the top shear blades 136 to snap radially inwardly to top the tree.

If, however, it is not desired to top the tree at a given minimum diameter or, if the predetermined minimum diameter desired is not reached as the unit travels along the tree, a top shear actuating mechanism is provided to close the top shears at a predetermined length. In FIG. 7, it can be seen that a top shear release cam 198 is provided on the mast frame 24 at a predetermined distance from the transfer grapple 46. For example, if it is desired to top all trees at a length no greater than 65 feet, the can 198 would be located at a predetermined distance from the transfer grapple 46 (such as 60 feet depending on the exact position that the transfer grapple 46 grabs the tree when receiving it from the felling grapple 32) so that the desired result can be accomplished. As can be seen in FIG. 7, a connecting arm 200 is attached to the trigger 154. This connecting arm 200 is attached at its opposite end to a cam follower arm 202. The cam follower arm 202 is pivoted about a fixed pivot 204 at one end and has a cam follower 206 at its other end. This cam follower 206 is adapted to engage the cam 198 as the unit 50 reaches the longitudinal location of the cam 198 on the mast frame 24. As can be seen in the transition from FIG. 8 to 7, the pivot arms 202 are pivoted downwardly as the cam follower follows the inclined surface of the cam 198 to pivot the trigger 154 against its retaining spring 194 about its pivot point 196 to thereby release the latch 152. As previously described when the latch 152 releases the floating block 144, the cutting blades 136 are allowed to snap into the closed position as shown in FIG. 7.

After the delimbing arms 80 and 82 have removed all branches from a tree and the topping shears 136 have topped the tree either at a predetermined diameter or length, the unit 50 moves on past the tree to the end of the mast 24. When it reaches the end of the mast 24, the cable drive device 72 reverses the direction of cable 68 to return the unit 50 to a position adjacent to the transfer grapple 46. As was described in the above-described co-pending application, after the unit 50 has delimbed and topped a tree, the transfer grapple 46 is actuated to drop the tree into a plurality of collection arms 208 which are fastened to one side of the mast frame 24. These collection arms 208 are capable of holding a number of delimbed and topped trees for transportation with the tree harvester 10. Additionally, the collection arms are adapted to pivot downwardly to simultaneously drop a bundle of processed trees at a predetermined collection point.

As the unit 50 traverses its return path adjacent to the transfer grapple 46, the mechanism retains its position shown in FIG. 7 and both the delimber arms 80 and 82 and the top shear blades 136 remain in the closed position. As the unit 50 approaches the transfer grapple 46 it again encounters the cam 178 as shown in FIG. 8. While the unit 50 moves from right to left in FIG. 8, the cam follower 174 moves along the inclined surface of the cam 178 thereby rotating the actuating plate 156 in the counterclockwise direction. This rotation of the actuating plate 156 causes the delimber arm cables 160 and 162 to be pulled towards and wound around the actuating plate 156. This retraction of the cables 160 and 162 causes a rotation of the delimber arms 80 and 82 against the force of their respective biasing springs (shown in FIGS. 10 through 13) so as to move the delimber arms to the open position (as shown in FIG. 3). Likewise, as the actuating plate 156 rotates counterclockwise, the pin 180 pushes the top shear opening bar 184 in a direction towards the right in FIG. 8 thereby rotating the timing gears 138 to open the top shear blades 136. As the timing gears are rotated, the connecting arms 146 pull the floating block 144 along the rectangular beam 148 against the force of spring 150 to a point where the latch 152 snaps in behind the floating block 144 under the action of spring 194 on trigger 154. Thus, the effect of cam 178 on cam follower 176 and the subsequent rotation of actuating plate 156 as the unit 50 returns to a position adjacent to the transfer grapple 46 results in the opening of both the delimber arms 80 and 82 and the top shear blades 136. The unit 50 then assumes the position shown in FIG. 3 and is ready to receive another tree for delimbing and topping.

Thus, the tree harvesting butt of this invention provides a tree harvesting machine which is capable of completely processing a plurality of trees and delivering them as a group to a predetermined collection point. Once the operator has directed the equipment to a given tree such that it has been grasped by the felling grapple unit 32 and severed by the but shear device 34, the tree is then automatically pivoted to a substantially horizontal position where it is grasped and held above the mast 24 by the grasping arms 48 on the transfer grapple 46. The delimber arms 80 and 82 are then closed into contact with the tree 42 and the delimber unit 50 is driven along the mast 24 and to remove all limbs from the tree. Once the delimber unit 50 reaches either a predetermined length or a predetermined diameter, as described previously, the top shears 136 are automatically closed to remove the top of the tree. The delimber unit 50 is then moved past the tree and the tree is released by the arms 48 and dropped into the collection arms 66. It should be noted that as soon as the tree is grasped and held by the arms 48 on the transfer grapple 46, the felling grapple unit 32 is rotated back to its initial position and the operator may proceed to adjust the position of the mast 24 so that the felling grapple unit 32 is positioned to grab a second tree while the first tree is being delimbed and topped. As soon as the first tree has been released by the holding arms 48 into the collection arms 66, a second tree may be sheared by the butt shear 34 and pivoted into position to be held by the arms 48 for delimbing and topping. Thus, while one tree is being processed the operator may position the equipment to grasp and shear the next tree so that the harvesting process becomes a continuous one.

Therefore, it should be clear that a continuous tree harvester is provided by this invention which is adapted to completely process trees in an extremely fast and economical manner. Previously, such tree harvesters have been adapted to sever and delimb only one tree at a time prior to approaching a second tree. In addition, they were not equipped to stack and carry a number of processed trees for dumping in a bundle at a predetermined collection point. In other words, previous such harvesters would process one tree at a time and drop it individually on the ground for collection at a later time. This, therefore, required the use of a separate tree gathering machine. In contrast to this, the novel tree harvester of this invention is capable of collecting on the machine a plurality of trees for transport with the machine and then dumping them in a group at a predetermined collection point. Thus, this self-transporting feature of the subject invention eliminates the need for a tree collection machine to be used for collecting individual trees deposited randomly throughout the forest.

The harvester of this invention is completely mobile in that it is supported on and powered by a tractor type vehicle which is adapted for travel over the rough terrain that is usually encountered in and around a forest. Also, because of the maneuverability of its horizontal mast the tree harvester of this invention is capable of reaching and processing a number of trees without changing the position of the main tractor support unit.

Additionally, the novel tree harvester of the subject invention required the labor of only one operator to cut, delimb, top and transport a group of trees for dumping in a stack at a collection point. In contrast to this, previously known procedures required several pieces of equipment and several operators to accomplish the same result. Thus, with the tree harvesting apparatus and method of this invention considerable expense is saved both in machinery and labor over previously known tree harvesting methods.

What is claimed is:

1. Apparatus for delimbing and topping a supported tree comprising, in combination:
    drive means connected to said apparatus for driving said apparatus along said supported tree;
    delimber blade means mounted on said apparatus and moveable into and out of engagement with said supported tree to remove all branches from the tree as said apparatus is driven along said tree;
    top shear knife means mounted on said apparatus and actuatable to remove the top portion of said tree;
    latching means carried by said apparatus for retaining the top shear knife means in an open position;
    and means carried by said apparatus for actuating said latching means to release said top shear knife means into engagement with said tree to top said tree upon movement of said apparatus to a predetermined distance along the length of said tree or in response to closing movement of said delimber blade means to a position corresponding to a predetermined diameter of said tree, whichever of these occurs first.

2. Tree harvesting apparatus comprising, in combination:
    a mobile vehicle;
    mast means mounted on said mobile vehicle;
    grapple means mounted at one end of said mast means and adapted to grasp, sever, and securely hold a standing tree in a position adjacent said mast means;
    and a delimbing and topping unit mounted for relative movement on said mast means and including drive means connected to said unit for driving said unit along said mast, a pair of delimber blades mounted on said unit and moveable into and out of engagement with the tree held by said grapple means to remove all branches from the tree as said unit is driven along said mast, a pair of top shear knives mounted on said unit and actuatable to remove the top portion of said tree, latching means carried by said apparatus for retaining the top shear knives in an open position, and means carried by said unit for actuating said latching means to release said top shear knives into engagement with said tree to top said tree upon movement of said unit to a predetermined distance along the length of said tree or in response to closing movement of said delimber blades to a position corresponding to a predetermined diameter of said tree, whichever of these occurs first.

3. Tree harvesting apparatus comprising, in combination:
    a mobile vehicle;
    mast means mounted on said mobile vehicle and oriented in a substantially horizontal direction;
    felling grapple means pivotally mounted at one end of said mast means and adapted to grasp, sever, and pivot a standing tree to a substantially horizontal position overlying said mast means;
    transfer grapple means fixed to said mast means adjacent said felling grapple means and adapted to receive a tree from said felling grapple means and securely hold the tree in a substantially horizontal position overlying said mast means;
    a delimbing and topping unit mounted for relative movement on said mast means and including drive means connected to said unit for driving said unit along said mast, a pair of delimber blades mounted on said unit and moveable into and out of engagement with the tree held by said transfer grapple means to remove all branches from the tree as said unit is driven along said mast, a pair of top shear knives mounted on said unit and actuatable to remove the top portion of said tree, latching means carried by said apparatus for retaining the top shear knives in an open position, and means carried by said unit for actuating said latching means to release said top shear knives into engagement with said tree to top said tree upon movement of said unit to a predetermined desired distance along the length of said tree or in response to closing movement of said delimber blades to a position corresponding to a predetermined desired diameter of said tree, whichever of these occurs first;
    and collection means attached to said mast means and adapted to receive a number of delimbed and topped trees to be transported with said tree harvesting apparatus.

4. Tree harvesting apparatus as set forth in claim 3 wherein said delimbing and topping unit further includes spring biasing means mounted on said unit for normally spring biasing said delimber blade into engagement with said tree.

5. Tree harvesting apparatus as set forth in claim 4 wherein said spring biasing means for each of said delimber blades comprises, in combination:
    a cylindrical housing mounted on said unit;
    a delimber blade mounting shaft keyed to one of said delimber blades for rotation therewith, said shaft mounted for rotation at one end to said unit and at the other end to said cylindrical housing;
    a first clutch plate positioned within said cylindrical housing and attached to said shaft for rotation therewith;
    a second clutch plate positioned within said cylindrical housing adjacent to said first clutch plate;
    said first and second clutch plates having mating grooves therein forming an annular inclined plane therebetween;
    a plurality of spherical balls positioned between said first and second clutch plates in the grooves therebetween; said balls combining with said grooves to translate axial movement of said second clutch relative to said cylindrical housing into rotational movement of said first clutch plate relative to said cylindrical housing;
    a coil spring positioned within said cylindrical housing and attached at one end to said second clutch plate;
    and spring actuating means positioned within said cylindrical housing and keyed to said cylindrical housing for axial movement only within said cylindrical housing, said spring actuating means attached to said coil spring and adapted to be moved axially within said cylindrical housing to compress said coil spring toward said second clutch plate to thereby cause axial movement of said second clutch plate relative to said cylindrical housing and rotational movement of the first clutch plate, delimber blade shaft, and delimber blade relative to said cylindrical housing.

6. Tree harvesting apparatus as set forth in claim 4 wherein said delimbing and topping unit further includes a counter-balance plate integral with each of said delimber blades and rotatable therewith, at least one of said counter-balance plates having a lost motion slot formed therein.

7. Tree harvesting apparatus as set forth in claim 6 wherein said means carried by said unit to actuate said latching means includes a pin restrained for movement within the lost motion slot in one of said counter-balance plates and a rod connected at one end to said pin and at the other end to said latching means for movement with said counter-balance plate to actuate said latching means and release said top shear knives into engagement with said tree to top said tree in response to closing movement of said delimber blades to a position corresponding to a predetermined desired diameter of said tree.

8. Tree harvesting apparatus as set forth in claim 5 wherein said delimbing and topping unit further includes a counter-balance plate integral with each of said delimber blades and rotatable therewith, at least one of said counter-balance plates having a lost motion slot formed therein.

9. Tree harvesting apparatus as set forth in claim 8 wherein said means carried by said unit to actuate said latching means includes a pin restrained for movement within the lost motion slot in one of said counter-balance plates and a rod connected at one end to said pin and at the other end to said latching means for movement with said counter-balance plate to actuate said latching means and release said top shear knives into engagement with said tree to top said tree in response to closing movement of said delimber blades to a position corresponding to a predetermined desired diameter of said tree.

10. Tree harvesting apparatus as set forth in claim 3 further including a first cam means positioned on said mast means at a distance from said transfer grapple means corresponding to a predetermined desired length of said tree.

11. Tree harvesting apparatus as set forth in claim 10 wherein said means carried by said unit to actuate said latching means further includes a lever arm pivotally mounted at one end to said unit, a first cam follower attached to the free end of said lever arm and adapted to engage and follow said first cam means as said unit passes over the location of said first cam means on said mast means, and a connecting arm connected at one end to said lever arm near the free end thereof and at the other end to said latching means for movement with said lever arm as said first cam follower engages and follows said first cam means to actuate said latching means and release said top shear knives into engagement with said tree to top said tree at a predetermined desired length of said tree.

12. Tree harvesting apparatus as set forth in claim 7 further including a first cam means positioned on said mast means at a distance from said transfer grapple means corresponding to a predetermined desired length of said tree.

13. Tree harvesting apparatus as set forth in claim 12 wherein said means carried by said unit to actuate said latching means further includes a lever arm pivotally mounted at one end to said unit, a first cam follower attached to the free end of said lever arm and adapted to engage and follow said first cam means as said unit passes over the location of said first cam means on said mast means, and a connecting arm connected at one end to said lever arm near the free end thereof and at the other end to said latching means for movement with said lever arm as said first cam follower engages and follows said first cam means to actuate said latching means and release said top shear knives into engagement with said tree to top said tree at a predetermined desired length of said tree.

14. Tree harvesting apparatus as set forth in claim 9 further including a first cam means positioned on said mast means at a distance from said transfer grapple means corresponding to a predetermined desired length of said tree.

15. Tree harvesting apparatus as set forth in claim 14 wherein said means carried by said unit to actuate said latching means further includes a lever arm pivotally mounted at one end to said unit, a first cam follower attached to the free end of said lever arm and adapted to engage and follow said first cam means as said unit passes over the location of said first cam means on said mast means, and a connecting arm connected at one end to said lever arm near the free end thereof and at the other end to said latching means for movement with said lever arm as said first cam follower engages and follows said first cam means to actuate said latching means and release said top shear knives into engagement with said tree to top said tree at a predetermined desired length of said tree.

16. Tree harvesting apparatus as set forth in claim 15 further including a second cam means positioned on said mast means near said transfer grapple means.

17. Tree harvesting apparatus as set forth in claim 15 wherein said delimbing and topping unit further includes opening means carried by said unit and engageable by said second cam means to move said top shear knives to an open position for re-engagement by said latching means and to overcome the force of said spring biasing means on said delimber blades to move said delimber arms to an open position upon movement of said unit along said mast means to the location of said second cam means on said mast means near said transfer grapple means.

18. Tree harvesting apparatus as set forth in claim 17 wherein said opening means includes a circular actuating plate rotatably mounted to said unit, a second cam follower attached to said actuating plate and adapted to engage and follow said second cam means and rotate said actuating plate upon engagement with said second cam means, a pair of cables each wrapped around a portion of the circumference of said actuating plate and attached at one end thereto, said cables each being attached at their other end to said counter-balance plates for rotating said counter-balance plates and delimber arms to an open position upon engagement of said second cam follower and said second cam means, a top shear opening bar attached to said top shear knives at one end and having a lost motion slot therein at its other end, and a pin positioned for movement within said lost motion slot in top shear opening bar and attached to said actuating plate for rotation therewith, said top shear opening bar opening said top shear knives upon engagement of said second cam follower with said second cam means.

19. Tree harvesting apparatus as set forth in claim 18 wherein said delimbing and topping unit further includes a pair of mating timing gears carried by said top shear knives to provide uniform opening and closing movement of said top shear knives.

20. Tree harvesting apparatus as set forth in claim 3 wherein said delimbing and topping unit further includes opening means carried by said unit for moving said top shear knives and said delimber blades to an open position upon movement of said unit on said mast means to a position near said transfer grapple means.

* * * * *